US008290266B2

(12) United States Patent
Liu

(10) Patent No.: US 8,290,266 B2
(45) Date of Patent: Oct. 16, 2012

(54) MODEL-BASED METHOD AND SYSTEM FOR IMAGE SEGMENTATION AND MODELLING

(75) Inventor: Jimin Liu, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 911 days.

(21) Appl. No.: 12/438,078

(22) PCT Filed: Aug. 24, 2007

(86) PCT No.: PCT/SG2007/000275
§ 371 (c)(1),
(2), (4) Date: Feb. 19, 2009

(87) PCT Pub. No.: WO2008/024083
PCT Pub. Date: Feb. 28, 2008

(65) Prior Publication Data
US 2010/0166275 A1    Jul. 1, 2010

Related U.S. Application Data

(60) Provisional application No. 60/839,684, filed on Aug. 24, 2006.

(51) Int. Cl.
*G06K 9/00* (2006.01)
(52) U.S. Cl. ..................................... 382/173
(58) Field of Classification Search .................. 382/128, 382/130–132, 154, 173, 199, 254, 256–257, 382/308; 700/98; 703/13; 345/419–422, 345/424; 378/4, 62; 128/922; 348/65, 72, 348/77, 135
See application file for complete search history.

(56) References Cited

U.S. PATENT DOCUMENTS

| 6,766,043 | B2* | 7/2004 | Zeng et al. | 382/128 |
| 6,813,373 | B1* | 11/2004 | Suri et al. | 382/128 |
| 6,845,260 | B2* | 1/2005 | Liu et al. | 600/410 |
| 6,892,089 | B1* | 5/2005 | Prince et al. | 600/410 |
| 7,359,538 | B2* | 4/2008 | Zeng et al. | 382/131 |
| 7,391,893 | B2* | 6/2008 | Liang et al. | 382/128 |
| 7,901,357 | B2* | 3/2011 | Boctor et al. | 600/443 |
| 8,064,664 | B2* | 11/2011 | Suri et al. | 382/128 |

OTHER PUBLICATIONS

Han, X. et al., "A Topology Preserving Level Set Method for Geometric Deformable Models", IEEE Transactions on Pattern Analysis and Machine Intelligence, vol. 25, No. 6, Jun. 2003, pp. 755-768.

(Continued)

*Primary Examiner* — Jose Couso
(74) *Attorney, Agent, or Firm* — Faegre Baker Daniels LLP

(57) ABSTRACT

A method is proposed for segmenting a 2- or 3-D space, spanned by a set of medical data comprising intensity values at locations within the space, to estimate the position of an object of medical significance. The method using a level set function having a level set which provides a model of boundary of the object. The level set function is iteratively updated by a force defined based on the medical data. For computational efficiency, only the force in the narrowband of the model boundary needs to be calculated. Minimization of an energy function, related to the force, provides a termination condition for the iteration. High level knowledge can be incorporated in several ways, such as by an explicit force term which takes over from the force based on the medical data when prior knowledge of the object is about to be violated by the model.

8 Claims, 3 Drawing Sheets

OTHER PUBLICATIONS

Suri, Jasjit S. et al., "Shape Recovery Algorithms Using Level Sets in 2-D/3-D Medical Imagery: A State-of-the-Art Review", IEEE Transactions on Information Technology in Biomedicine, vol. 6, No. 1, Mar. 2002, pp. 8-28.

Seithian, J.A., "Level Set Methods and Fast Marching Methods", Level Set Methods and Fast Marching Methods, Evolving Interfaces in Computational Geometry, Fluid Mechanics, Computer Vision, and Materials Science, Jan. 1, 1999, pp. 3-13; 77-85; 101-140; 159-163; 214-222.

Xu, Chenyang et al., "Snakes, Shapes and Gradient Vector Flow", IEEE Transactions on Image Processing, vol. 7, No. 3, Mar. 1998; pp. 359-369.

Siddiqui, Kaleem et al., "Flux Maximizing Geometric Flows", IEEE Transactions on Pattern Analysis and Macine Intelligence, vol. 24, No. 12, Dec. 2002, pp. 1565-1578.

International Search Report for PCT/SG2007/000275 issued by the European Patent Office on May 30, 2008.

International Preliminary Report on Patentability from PCT/SG2007/000275.

\* cited by examiner

MODEL-BASED METHOD AND SYSTEM FOR IMAGE SEGMENTATION AND MODELLING

CROSS-REFERENCE TO RELATED APPLICATIONS

This application is a U.S. National Phase Application of PCT International Application No. PCT/SG2007/000275, filed on Aug. 24, 2007, which claims the benefit of U.S. Application Ser. No. 60/839,684, filed on Aug. 24, 2006, both of which are expressly incorporated by reference herein.

FIELD OF THE INVENTION

The present invention relates to a method and system for segmenting a space spanned by a set of medical data, such as a 2- or 3-dimensional MRI image of at least part of a brain or other structure consisting of a set of intensity values at corresponding locations in the space. The segmentation produces a model of an object having medical significance, that is an estimate of the portion of the space occupied by the object.

BACKGROUND OF THE INVENTION

Since their introduction by Kass et al. (Kass 1988), a variety of deformable models have been proposed and used in a numerous areas such as image segmentation, shape modeling, and object tracking. Existing deformable models can be classified as either parametric deformable models (PDMs) (Kass, 1988; Cohen, 1991; Xu, 1998; McInery, 1996; Cottes, 1991, 2001; Shen, 2001; Liu, 2005) or geometric deformable models (GDMs) (Malladi, 1995; Caselles, 1997; Yezzi, 1997; Sethian, 1999; Han, 2003) according to their representation and implementation. In particular, PDMs are represented explicitly as parameterized curves or surfaces in a Lagrangian formulation. GDMS, on the other hand, are represented implicitly as level sets of higher-dimensional level set functions. That is, to model a contour within a 2-D space, or a surface within a 3-D space, we define a continuous function (a level set function) which takes a certain value (e.g. zero) on the contour or surface (referred to as the "level set"), and a non-zero value elsewhere. The level set function evolves according to an Eulerian formulation (Sethian 1999).

GDMs are superior to PDMs in the following aspects:

Model representation and construction. GDMs are completely intrinsic and independent of the parameterization of the evolving contour. Thus, there is no need to add or remove nodes from the initial parameterization or adjust the spacing of the nodes. For PDMs, particularly, in the 3D cases, it is not a trivial task to generate parameterized representations for surface models.

Model property calculation. The intrinsic geometric properties of a geometric deformable model, such as its normal and curvature, can be easily determined from the level set function.

Shape adaptation. In GDMs, the propagating contour or surface can automatically change its topology (e.g., merge or split) without requiring an elaborate mechanism to handle such changes.

Self-intersection detection. When the topology preserving transformations are required for a deformable model, self-intersections can become a problem. In GDMs, digital topology methods (Bertrand 1994) are available to detect self-intersections, while in PDMs, the computational demands related to self-intersection detection are usually very high (MacDonald 2000).

On the contrary, PDMs have the following merits over GDMs:

Model constraints. Since PDMs are represented globally, it is convenient to add high level constraints on shape and topology. These constraints are particularly important when local features of the model and image are liable to deform the model in unexpected ways.

Leakage prevention. Leakage from the boundary is less common in PDMs, whereas it is sensitive to boundary gaps and weak edges in GDMs.

Convergence detection. The deformation procedures in PDMs have an explicit stop condition which is the minimization of some kinds of energy function, whereas in GDMs, the procedure usually stops when the certain number of iterations reaches a predetermined maximum, but no simple and fast methods are available to automatically estimate a suitable maximum number of iterations.

SUMMARY OF THE INVENTION

The present invention aims to provide new and useful ways to estimate, within a space spanned by a set of medical data (e.g. MRI data consisting of intensity values at many corresponding locations in a two- or three-dimensional space), the portion of the space occupied by an object.

In general terms, the present invention proposes a boundary-based geometrical deformable model (BGDM). That is, a model is represented by a level set function, which is modified by force calculated using the medical data and the boundary of the model.

Thus, in a way similar to traditional geometrical deformable models, the invention employs a model which is embedded in a level set of a higher-dimensional function, while in a way similar to the traditional parametric deformable models, the deformation of the model is calculated by force on its boundary.

The convergence condition used for termination of the iteration may be the minimization of an energy function related to the force. Thus, the embodiments of the invention may have the convergence advantages of PDMs.

The force used to deform the level set function may be calculated at each point of a narrowband region (neighbourhood) of the level set, and the level set function modified only at these locations. This reduces the computational burden, compared to modifying the entire level set function in all iterations. Upon detecting that the level set approaching the boundary of the narrowband region, portions of level set function outside the narrowband region may be refreshed.

The narrowband may include two sets of locations (pixels in a 2D space or voxels in a 3D space): first locations at the boundary of the model (level set) and second locations in a neighbourhood of the boundary ("narrowband region"). The force at the first locations is calculated using the medical data, and the force at the second locations is calculated using the calculated force at the first locations. Specifically, around each of the second locations a neighbourhood may be defined, and the force at the second locations can be found by reference to the force at those first locations which are within the neighbourhood. It has been found that this use of neighbourhoods reduces (or even avoids) the leakage problem (in which the object may wrongly grow to other regions of the space).

High level knowledge about the object can be incorporated in any one or more of several ways. First, it may be used in the definition of the force which modifies the level set function (e.g. such that when it appears that a predetermined fact about the object is to be contravened by the modification, the force switches from being one based on the medical data to one which incorporates the prior knowledge). Secondly, it may be used to choose the exact form of the force which is calculated using the medical data. Thirdly, the modification of the level set function may only be performed when this does not violate some prior knowledge of the object.

The force which is calculated using the medical data may be a "gradient flux"-based force, which is a function of the gradient of intensity values of the medical data. The gradient flux-based force at each point on the level set may be obtained efficiently by searching along a line segment passing through that point and normal to the level set at that point, for a location which maximises the value of a gradient flux density which is a function of the gradient of the intensity values (or more generally, a location which is a stationary point of the gradient flux density). In a manner inspired by electromagnetic systems, the gradient flux density may vary as a linear function of the gradient of the intensity values divided by a linear function of the square of the distance of the location from the level set (i.e. analogous to an inverse square law). The energy function may be average of the gradient flux density over the level set.

One specific expression of the invention is a method of image segmentation and modelling, within a space spanned by a set of medical data, the portion of the space occupied by an object, the method comprising:

(a) defining a level set function, a level set of the level set function being the boundary of a deformable model of the object;

(b) iteratively performing at least once the set of steps:

(i) calculating, at each of a plurality of locations, a corresponding force, said force being calculated using the medical data and the boundary of the model; and (ii) modifying the level set function at the plurality of locations according to the corresponding calculated forces; and (c) modelling the boundary of the said object as the level set of the modified level set function.

However, the invention may alternatively be expressed as a computer system arranged to carry out this method, or as a computer program product (i.e. software) which when run by a computer causes the computer to carry out the method.

DESCRIPTION OF THE DRAWINGS

An embodiment of the invention will now be described for the sake of example only with reference to the following figures, in which.

DETAILED DESCRIPTION OF EMBODIMENTS

1. Overview of Embodiment

Figure 1:
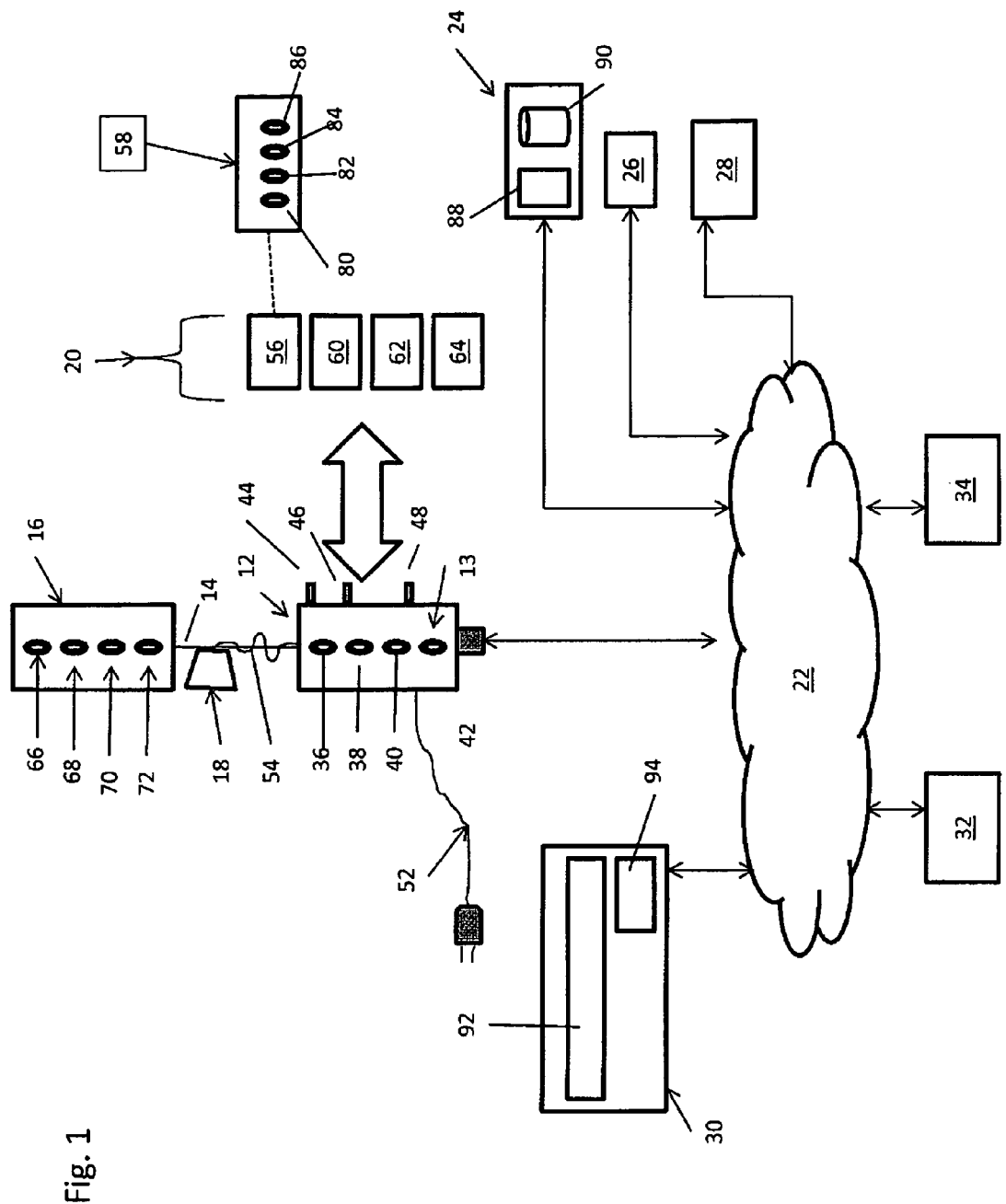
FIG. 1 shows schematically the calculation of the gradient flux density at a boundary point x of the model in an embodiment of the invention.
Figure 2:
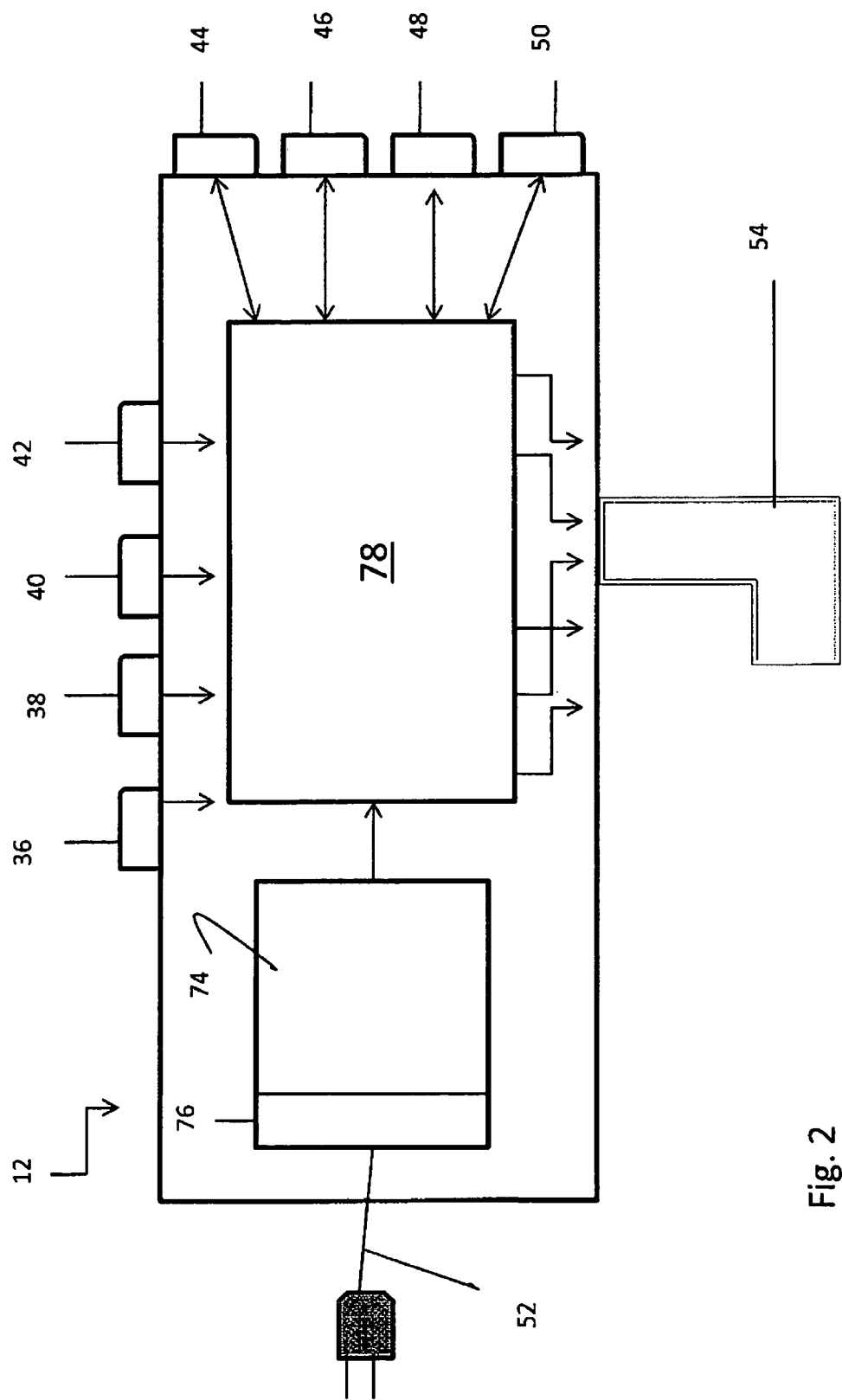
FIG. 2 shows segmentation results using the embodiment for orbital muscles in MR image: a) original image, b) the initial position of five numbered contours, b) final positions obtained by deforming each of the initial contours iteratively using the embodiment.
Figure 3:
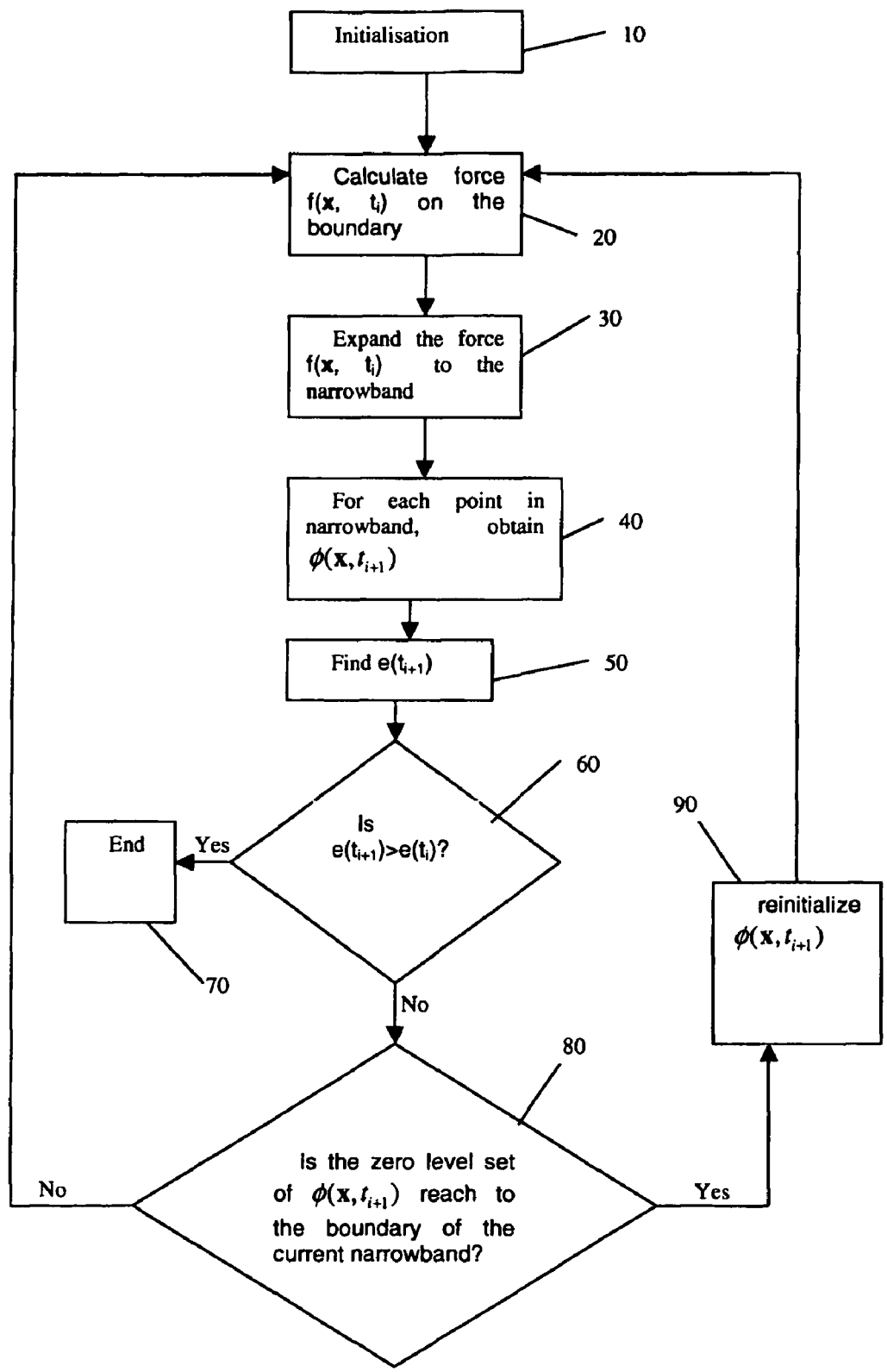
FIG. 3 is a flow diagram of the steps of the embodiment.

An embodiment of the invention will now be described with reference to FIGS. 1 to 3. This embodiment is used for the segmentation of a medical dataset which is a set of intensity values, such as an MR image. The intensity values are associated with respective points in a two- or three-dimensional space. The segmentation identifies an object within the image. Specific examples are given of the use of the embodiment for segmenting orbital muscles within MR images, but application of the embodiment to other segmentations tasks is straightforward.

The embodiment employs an initial model which is defined in the space of the image. If the space of the image is 2D, the initial model is a contour represented polygon, or, if the space of the image is 3D, the model is a surface represented by triangle meshes. The contour or surface forms one or more closed inside regions which indicate object itself. The model is chosen manually based on the prior-knowledge of the object's shape and size, and initially located according the location of the object in the image. This model is then allowed to evolve, according to equations defined below, within the space of the image to form a final model which is the estimate of the position of the object.

Positions in the space are denoted by a vector x. The initial model is expressed as a zero level set of a higher dimensional level set function $\phi(x,t)$, defined as follows. The initial value of $\phi(x,t)$ at time t=0, that is $\phi(x,0)$, is defined as the signed Euclidian distance map (Maurer 2003) of the model: with negative value inside the model, and positive outide the model. The evolution of the function $\phi(x,t)$ is governed by the following equation:

$$\phi_t(x,t) = -n(x,t) \cdot f(x,t) \tag{1}$$

where, $\phi_t(x,t)$ denotes the time derivative of $\phi(x, t)$, $f(x,t)$ denotes the total force which is a function of the model at time t and of the image dataset (explicit expressions for $f(x, t)$ are given below), and $n(x, t)$ is the unit normal of the level set, i.e. the unit vector which is defined by:

$$n(x,t) = \nabla \phi(x,t) / |\nabla \phi(x,t)|. \tag{2}$$

The numerical solution of Equation (1) is obtained by approximating the real time variable t by a series of discrete time $t_i = i \cdot \Delta t$, where i=0, 1, 2, ... and the time step is denoted as $\Delta t$. The functions $\phi_t(x,t)$, $n(x,t)$ and $f(x,t)$ can be approximated as $\phi(x,t_i)$, $n(x,t_i)$ and $f(x,t_i)$ respectively. The time derivative $\phi_t(x,t)$ is approximated as the difference between the respective values of $\phi(x,t_i)$ at two successive time steps, divided by $\Delta t$. The spatial derivative on the right hand side of (2) is treated by upwind numerical schemes (Sethian, 1999), which gives:

$$\phi(x,t_{i+1}) = \phi(x,t_i) - \Delta t \cdot n(x,t_i) \cdot f(x,t_i) (i=0,1,2,\ldots). \tag{3}$$

To describe the evaluation state of the deformable model at a given time t, we introduce several notations:

s(x,t): the sign of the function $\phi(x,t)$, i.e.:

$$s(x, t) = \begin{cases} 1 & \text{if } \phi(x, t) \le 0 \\ -1 & \text{if } \phi(x, t) > 0 \end{cases} \tag{4}$$

$\Omega(t)$: the region occupied by the deformable model, i.e.:

$$\Omega(t) = \{x | s(x,t) = 1\} \tag{5}$$

That is, the set of all locations x such that $\phi(x, t)$ is at least zero.

$\partial(t)$: the boundary of the region $\Omega(t)$, i.e. the set of all locations such that $\phi(x,t) = 0$.

$b^r(t)$: the "narrowband" of the boundary $\partial(t)$, which is defined as the set of points with Euclidean distance to $\partial(t)$ less than a given threshold r.

(S): the cardinal number which is equal to the number of discrete points in a given set S.

2. Gradient Flux

We now turn to the problem of defining $f(x,t_i)$. To do so, we first define a novel function called the "gradient flux".

To begin with, according to the object we are trying to model, we define a "gradient characteristic number" g, which describes the gradient direction at a boundary of the object. In general terms, we select g according to whether the desired object is a valley of the intensity (g=1), or a peak of the intensity (g=−1). If the desired object is neither of these things, such as a saddle-point of the intensity, we select g=0. More specifically, if the object is such that all gradients on the object boundary point to the outside, g is set to 1. If all gradients on the objection boundary point to the inside, g is set to −1. Otherwise, g is set to 0. For example, in a T1 MR orbital image, g is 1 for orbital muscles; in T1 MR human brain images, g is 1 for the hippocampus, −1 for ventricles, and 0 for caudate nuclei.

Now we define the "gradient flux" as follows. This is intended to produce the result that the nearer the boundary of the model is to that of the object in the image, the larger the average gradient flux on the boundary of the model. Referring to FIG. 1, we denote the boundary $\partial(t)$ of the model at time t by reference numeral 1. Thus, the model at this time is the region $\Omega(r)$ to the left of the model boundary 1. The (unknown) boundary of the object which is to be identified by the segmentation technique is denoted by reference numeral 3.

Consider a point 5 on the boundary 1. The point 5 has coordinate x, and the normal direction to the boundary at this point is shown on FIG. 1 as n(x,t). We will define the gradient flux at point 5 such that only the corresponding point in the image contributes to the gradient flux at point x. The corresponding point on the image is defined in such a way that it requires little computing cost to find it. Specifically, it is defined as a point on the line segment which has its centre at point x and extends in direction n(x,t) to a predefined length d outside of the boundary $\partial(t)$, and in direction −n(x,t) to a predetermined length d inside the boundary. Thus, to find this corresponding point we only have to search along this line segment, which is relatively computationally cheap. Any point on the line segment has coordinates x+r·n(x,t), and denoting the intensity value of the image dataset at this point on the line segment as I(x+r·n(x,t)), the gradient vector of the image intensity at this point can be written as $\nabla I(x+r \cdot n(x,t))$. It is expected that the point 7 at which the line segment intersects with the object boundary 3 is such that $\nabla I(x+r \cdot n(x,t))$ is a local maximum. Furthermore, $\nabla I(x+r \cdot n(x,t))$ should be consistent with the expected direction: if the gradient characteristic number g of the object is 1, then the gradient vector $\nabla I(x+r \cdot n(x,t))$ should point to the outside of the model; and if the gradient characteristic number g is −1, then the gradient vector $\nabla I(x+r \cdot n(x,t))$ should point to the inside of the model.

To give a numerical value to the gradient flux, suppose that a point charge were located at point x+r·n(x,t). Thus, the electric flux density at point x would decrease with the distance r according to the function $3/(4\pi r^2)$. By analogy, we will define the gradient flux density at any point along the line segment such that the gradient flux decreases with the distance to the boundary in the same way as the electric flux. In order to avoid the gradient flux becoming infinite for r=0, we define the gradient flux using the function $3/(4\pi r^2+1)$ instead of $3/(4\pi r^2)$, so that gradient flux is defined at r=0.

According to these heuristic rules, the embodiment calculates the gradient flux density e(x, n(x, t)) at any model boundary point 5 having location x as:

$$e(x, n(x, t)) = \max_{|r| \leq d} \{ \frac{3}{4\pi r^2 + 1} \xi(g, n(x, t), \nabla I(x + r \cdot n(x, t))) \}, \quad (6)$$

where n(x, t) denotes the outside normal of the model boundary 1 at point x; $\nabla I(x+r \cdot n(x,t))$ is the gradient of the image at x+r·n(x,t); d is the predefined maximum search length; the function $\xi$ indicates the consistency requirement concerning the gradient direction, and is defined as:

$$\xi(g, n(x, t), \nabla I(x + r \cdot n(x, t))) = \quad (7)$$
$$\begin{cases} g \cdot n(x, t) \cdot \nabla I(x + r \cdot n(x, t)) & \text{for } g = 1 \text{ or } g = -1 \\ |\nabla I(x + r \cdot n(x, t))| & \text{for } g = 0 \end{cases}$$

3. Force Calculation

Having now defined the gradient flux, we can now define the force f(x,t) used in Eqn. (1). Unlike traditional level set techniques, in which the force f(x,t) is directly calculated at the point x, we first calculate the force on the model boundary, and then expand the force to a narrowband of the boundary.

Specifically, for a point x on the boundary $\partial(t)$, we define its neighborhood $N^r(x,t)$ as the set of points that are on the boundary $\partial(t)$ and which have distance to x less than a given threshold r. As in deformable surface models (Liu 2005, Shen 2001), a boundary point x of the model is considered as the vertex of its boundary patch $N^r(x,t)$, on which the force at point x is calculated. The calculation combines the model constraint(s) with image features. This is done by defining the total force f(x,t) using (i) a gradient flux-based force $f_a(x,t)$ obtained using the gradient flux as defined above, which in turn is based on the intensity values, and (ii) an intensity based force $f_b(x,t)$ which ensures that model obeys the model constraints.

First we obtain the gradient flux-based force. As a first step, the total gradient flux $q_0(x,t)$ on the boundary patch $N^r(x,t)$ is calculated as:

$$q_0(x, t) = \sum_{x' \in N^r(x,t)} e(x', n(x', t)). \quad (8)$$

Then, the gradient fluxes $q_+(x,t)$ and $q_-(x,t)$ are calculated. These correspond respectively to the patch $N^r(x,t)$ being shifted to the outside of the model region $\Omega(r)$ with unit translation n(x,t), and inside the model region $\Omega(t)$ with unit translation −n(x,t)).

$$q_+(x, t) = \sum_{x' \in N^r(x,t)} e(x' + n(x', t), n(x', t)) \quad (9)$$

$$q_-(x, t) = \sum_{x' \in N^r(x,t)} e(x' - n(x', t), n(x', t)) \quad (10)$$

where, x'+n(x',t) and x'−n(x',t) are points obtained by shifting the point x' with translation n(x',t) and −n(x',t) respectively.

When the $q_+(x,t)$ is higher than $q_-(x,t)$ and $q_0(x,t)$, the model boundary $\partial(t)$ is attracted to expand at point x; when $q_-(x,t)$ is higher than $q_+(x,t)$ and $q_0(x,t)$, the boundary $\partial(t)$ is urged inward at point x; in other cases, the boundary should remain stationary. Based on these heuristic rules, the gradient flux-based force $f_a(x,t)$ is calculated as:

$$f_a(x,t) = \begin{cases} q_+(x,t) \cdot n(x,t) & q_+(x,t) > q_0(x,t), q_+(x,t) > q_-(x,t) \\ -q_-(x,t) \cdot n(x,t) & q_-(x,t) > q_0(x,t), q_-(x,t) > q_+(x,t) \\ q_0(x,t) \cdot n_\infty & \text{otherwise} \end{cases} \quad (11)$$

where, $n_-$ is the unit vector $n(x,t)$ with an additional flag to indicate that the force is used to keep the boundary $\partial(r)$ fixed at point x.

Now we calculate the intensity-based force. Let $\mu(t)$ and $\sigma(t)$ denote the mean and variation of the image intensity within the region, and let and $l(x,t)$ denote the mean of the image intensity on the boundary patch $N^r(x,t)$, i.e.:

$$\mu(t) = \sum_{x \in \Omega(t)} I(x) / \#(\Omega(t)) \quad (12)$$

$$\sigma(t) = \sqrt{\sum_{x \in \Omega(t)} [I(x) - \mu(t)]^2 / \#(\Omega(t))} \quad (13)$$

$$\bar{I}(x,t) = \sum_{x' \in N'(x)} I(x') / \#(N'(x,t)) \quad (14)$$

In the case that the gradient characteristic number g of an object is 1, i.e. the intensity inside the object is less than that outside the object, if the intensity $\bar{l}(x,t)$ at the boundary point x is greater than $\mu(t)+\sigma(t)$, it is expected that it will be necessary to remove point x from region $\Omega(t)$. Thus, we generate an intensity-based force at x which pushes the boundary $\partial(t)$ toward the inside of the region $\Omega(t)$. Conversely, otherwise, if $\bar{l}(x,t)<\mu(t)+\sigma(t)$, then we generate an intensity-based force to push x outwards. The cases for g=−1 and 0 are similar to g=1. Specifically, motivated by these heuristic rules, the embodiment generates an intensity-based force $f_b(x,t)$ at a boundary point x which is calculated as:

$$f_b(x,t) = \begin{cases} n(x,t) \cdot \varphi(1 - g \cdot [\bar{I}(x) - \mu(t)] / \sigma(t)) & (g = 1, -1) \\ n(x,t) \cdot \varphi(1 - |\bar{I}(x) - \mu(t)| / \sigma(t)) & (g = 0) \end{cases} \quad (15)$$

where the cut function $\varphi$ is defined by:

$$\varphi(u) = \min(1, \max(-1, u)). \quad (16)$$

and accordingly limits the force $f_b(x,t)$ within the interval $[-1, 1]$.

Let $\underline{f}_a(t)$ and $f_{max}(t)$ denote the average and maximum magnitude of forces $f_a(x,t)$ on the boundary $\partial(t)$, i.e.:

$$\underline{f}_a(t) = \sum_{x \in \partial(t)} |f_a(x,t)| / \#(\partial(t)) \quad (17)$$

$$f_{max}(t) = \max_{x \in \partial(t)} |f_a(x,t)| \quad (18)$$

The total force $f(x,t)$ is finally estimated from the gradient flux-based force $f_a(x,t)$ and the intensity-based force $f_b(x,t)$ with the force $f_a(x,t)$ as the priority:

$$f(x,t) = \begin{cases} 0 & f_a(x,t) = q_0(x,t) \cdot n_\infty \\ f_a(x,t) / f_{max}(t) & f_a(x,t) \ne q_0(x,t) \cdot n_\infty, |f_a(x,t)| > \underline{f}_a(t) \\ f_b(x,t) & \text{otherwise} \end{cases} \quad (19)$$

We have now fully defined all elements of Eqn. (1) for a point on the boundary. The algorithm implements the level set evolution by a fast narrowband approach (Sethian 1999). We expand the boundary force $f(x,t)$ into a narrowband $b^r(t)$ of the boundary $\partial(t)$.

In the 3D case, for any voxel x we use $N_{26}(x)$ to denote its 26-neighborhood (i.e. its 26 nearest neighbours, which are directly adjacent). At any given time t, we define a set of neighbourhoods $\{\Omega^{(k)}\}$, for k=0, 1, 2, ..., with corresponding boundaries $\{\partial^{(k)}\}$. $\Omega^{(0)}$ is defined to be equal to $\Omega(t)$, and its boundary $\partial^{(0)}$ is initially set to $\partial(t)$. For k=0, 1, 2, etc. we define the region $\Omega^{(k+1)}$ and its boundary $\partial^{(k+1)}$ iteratively from $\Omega^{(k)}$ and $\partial^{(k)}$:

$$\partial^{(k+1)} = [\cup_{x \in \partial^{(k)}} N_{26}(x)] - \Omega^{(k)}, \Omega^{(k+1)} = \Omega^{(k)} \cup \partial^{(k+1)} \quad (20)$$

The force $f(x,t)$ on the set of points $\partial^{(0)}$ is first calculated according to Eqn. (19). The embodiment then uses the force on each set of points $\partial^{(k)}$ to obtain the force on the set of points $\partial^{(k+1)}$ as follows. For any voxel which is $\partial^{(k+1)}$ and has position x, the force $f(x,t)$ is a weighted average of the force on those of its 26 nearest-neigbors which are in the set $\partial^{(k)}$, i.e.:

$$f(x,t) = \sum_{x' \in N_{26}(x) \cap \partial^{(k)}} f(x',t) / d(x,x') / \#(N_{26}(x) \cap \partial^{(k)}) \quad (21)$$

where, $d(x,x')$ denotes the Euclidean distance of two points x and x'.

The force expansion in the 2D case is similar to that in the 3D case. It differs just by changing the 26-neighborhood in the 3D case into a 8-neighborhood in the 2D case.

4. Energy Function

The embodiment makes use of an "energy function" to determine when its iterations should terminate. The energy $\bar{e}(t)$ of the model is estimated as the negative of the average gradient flux density on the model boundary $\partial(t)$:

$$\bar{e}(t) = -\sum_{x \in \partial(t)} e(x, n(x,t)) \#(\partial(t)) \quad (22)$$

5. Implementation Algorithm

We are now in a position to define the complete algorithm. This will be explained with reference to FIG. 3. The algorithm used by the embodiment is based on the topology preserved narrowband method presented in (Han 2003). Specifically, we propose the following algorithm to update the value $\phi(x, t_{i+1})$ from $\phi(x, t_i)$:

1. Initialisation (step 10). Set i=0 and the initial value $\phi(x,t_0)$ to be the signed Euclidean distance map of the initial model (i.e. it is zero for each point on the contour (2D case) or surface (3D case) which is the initial estimate of the object position, and at all other points is the Euclidian distance from the contour/surface multiplied by a sign −1 or +1 according whether the point is inside or outside the region enclosed by the contour or surface). Initialize the sign function $s(x, t_0)$, and the narrowband $b^k(t_0)$, where k is a manually-set parameter to specify the width of the narrowband $b^k(t)$ which is defined as the region $\Omega^{(k)}$ obtained according to Eqn 20.

2. Calculate force $f(x, t_i)$ on the boundary $\partial(t_i)$ of the model region $\Omega(t_i)$ (step 20).
3. Expand the force $f(x,t)$ from boundary $\partial(t_i)$ to its narrowband $b^k(t_i)$ (step 30).
4. For each point x in $b^k(t_i)$, calculate the new value $\phi(x,t_{i+1})$ (step 40)
   a) Detect whether x is a simple point of the point set $\Omega(t_i)$ using the method presented in (Bertrand, 1994), where, a simple point means its addition or removal from $\Omega(t_i)$ will not change the topology of $\Omega(t_i)$.
   b) If x is a simple point, update $\phi(x,t_{i+1})$ according to Eqn. (3), and then update $s(x,t_{i+1})$ according to Eqn. (4).
   c) Otherwise, i.e., x is not a simple point, set $\phi(x,t_{i+1}) = \epsilon^*\text{sign}(\phi(x,t_i))$, where, $\epsilon$ is a small positive number, so that $\phi(x,t_{i+1})$ takes a small value while keep the same sign with the old value $\phi(x,t_i)$. In this way, the topology of $\Omega(t_i)$ is preserved.
5. Calculate the total energy $e(t_{i+1})$ (step 50).
6. Determine whether $e(t_{i+1}) > e(t_i)$ (step 60), and if so return $\phi(x,t_i)$ as the final evolution result (step 70); otherwise, go to the next step to begin the next iteration. Alternatively, the termination criterion may be based on the number of iterations reaching a threshold. These two approaches may be combined, so that the algorithm terminates if the number of iterations reaches a threshold without a minimal energy having been reached.
7. Reinitialization: Determine if the zero level set of $\phi(x,t_{i+1})$ reaches to the boundary of the current narrowband $b^k(t_i)$ (step 80). If so, reinitialize $\phi(x, t_{i+1})$ to be the signed distance function of its zero level set (step 90).

6. Results

The embodiment was used to segment orbital muscles from MR images. FIG. 2 shows the segmentation of five muscles with five models in one 2D slice. FIG. 2(*a*) shows the intensity values of the data set. FIG. 2(*b*) shows the initial contours. FIG. 2(*c*) shows the result of the embodiment. It can be seen that the models are deformed to fit the original data quite accurately.

REFERENCES

1. Kass, M., Witkin, A., and Terzopoulos, D. (1988) "Snakes: Active contour models," Int. J. Comp. Vision, vol. 1, pp. 321-331.
2. Cohen, L. D. (1991) "On active contour models and balloons," CVGIP: Image Understanding, 53, pp. 211-218.
3. Xu, C. and Prince, J. L. (1998) "Snakes, shapes, and gradient vector flow," IEEE Trans. Imag. Proc., 7(3), pp. 359-369.
4. McInerney, T. and Terzopoulos, D. (1996) "Deformable models in medical image analysis: A survey," Medical Image Analysis, 1(2), pp. 91-108.
5. Cootes T. F., Cooper D., Taylor C. J. and Graham J. (1995) "Active shape models: Their training and Application", CVIU vol. 61, no. 1, pp. 38-59.
6. Cootes T. F., Edwards G. J. and Taylor C. J (2001) "Active appearance models," IEEE Trans. PAMI vol. 23, no. 6, pp. 681-685
7. Shen D., Herskovits E. H. and Davatzikos C (2001) "An Adaptive-Focus Statistical shape model for segmentation and shape modeling of 3-D Brain structure", IEEE Tran. Med. Imag. vol. 20, no. 4, pp. 257-270
8. MacDonald, D., Kabani, N., Avis, D., and Evans, A. C. (2000) "Automated 3-D extraction of inner and outer surfaces of cerebral cortex from MRI," NeuroImage, 12, pp. 340-356.
9. Liu J., Aziz A. (2005) "Deformable associate net approach for chest CT image segmentation", Proc. SPIE Medical Imaging: Image Processing, Volume 5747 pp. 453-462.
10. Malladi, R., Sethian, J. A. and Vemuri, B. C. (1995) "Shape modeling with front propagation: A level set approach," IEEE Trans. PAMI, 17, pp. 158-175
11. Caselles, V., Kimmel, R., and Sapiro, G. (1997) "Geodesic active contours," Int J. Computer Vision, 22, pp. 61-79.
12. Yezzi, A., Kichenassamy, S., Olver, P., and Tannenbaum, A. (1997) "A geometric snake models for segmentation of medical imagery," IEEE Trans. Med. Imaging, 16, pp. 199-209
13. Sethian, J. A. (1999) Level Set Methods and Fast Marching Methods. Cambridge, UK: Cambridge University Press, 2 ed.
14. Han X, Xu C, Prince J. L. (2003) "A Topology Preserving Level Set Method for Geometric Deformable Models" IEEE Trans. on PAMI, Vol. 25, No. 6, pp. 755-768
15. Bertrand, G. (1994) "Simple points, topological numbers and geodesic neighborhoods in cubic grids," Pattern Recognition Letters, 15, pp. 1003-1011
16. Maurer C. R., Qi J. R. and Raghavan V. (2003) A linear time algorithm for computing exact Euclidean distance transforms of binary images in arbitrary dimensions. IEEE Trans. PAMI, vol. 25 no. 2, pp. 265-270.

The invention claimed is:

1. A method of image segmentation and modeling, within a space spanned by a set of medical data, a portion of the space occupied by an object, the method comprising carrying out on a computer:
   (a) defining a level set function, a level set of the level set function being the boundary of a deformable model of the object;
   (b) iteratively performing at least once the set of steps:
      (i) calculating, at each of a plurality of first locations on the boundary, a corresponding force, said force being calculated using the medical data;
      (ii) calculating, at each of a plurality of second locations which are defined using the boundary and which are not on the boundary, a corresponding force, said force being calculated using said calculated forces at the first locations, wherein the force at said second locations is calculated by defining, for each said second location, a corresponding neighbourhood, and calculating the force at the second location using the average of said calculated forces at each said first location within the corresponding neighbourhood; and
      (iii) modifying the level set function at the first and second locations according to the calculated corresponding forces;
      the iteration terminating when a minimum of an energy function is reached, the energy function being related to the calculated forces at the first locations on the boundary; and
   (c) modeling the boundary of said object as the level set of the modified level set function.

2. A method according to claim 1 in which the force at first locations is calculated selectively as either:
   (i) a gradient flux-based force which is a function of the gradient of intensity values of the medical data; or ii) an intensity-based force which ensures that, following the modification of the level set function, the model still obeys predetermined model constraints.

3. A method according to claim 2 in which the gradient flux-based force at each point on the level set of the level set function is obtained by searching along a line segment passing through that point and normal to the level set at that point, for a location which is a stationary point of a gradient flux density which is a function of the gradient of the intensity values, and obtaining the force as the gradient flux density at the stationary point.

4. A method according to claim 3 in which the gradient flux density varies as a linear function of the gradient of the intensity values divided by a linear function of the square of the distance of the location from the level set.

5. A method according to claim 1 in which the energy function is the average over the level set of an energy level.

6. A method according to claim 3 in which the energy function is the average over the level set of the gradient flux density.

7. A system for modeling, within a space spanned by a set of medical data, a portion of the space occupied by an object, the system having a processor arranged to:
   (a) receive medical data;
   (b) define a level set function, a level set of the level set function being the boundary of a deformable model of the object;
   (c) iteratively perform at least once the set of steps:
      (i) calculating, at each of a plurality of first locations on the boundary, a corresponding force, said force being calculated using the medical data;
      (ii) calculating, at each of a plurality of second locations which are defined using the boundary and which are not on the boundary, a corresponding force, said force being calculated using said calculated forces at the first locations, wherein the force at said second locations is calculated by defining, for each said second location, a corresponding neighbourhood, and calculating the force at the second location using the average of said calculated forces at each said first location within the corresponding neighbourhood; and
      (iii) modifying the level set function at the first and second locations according to the corresponding calculated forces;
      the iteration terminating when a minimum of an energy function is reached, the energy function being related to the calculated forces at the first locations on the boundary; and
   (d) output a model of the boundary of said object which is the level set of the modified level set function.

8. A computer program product having program instructions which, when implemented by a computer system, cause the computer system to generate a model, within a space spanned by a set of medical image data, of a portion of the space occupied by an object, by
   (a) defining a level set function, a level set of the level set function being an initial model of the boundary of the object;
   (b) iteratively performing at least once the set of steps:
      (i) calculating, at each of a plurality of first locations, a corresponding force, said force being calculated using the medical image data and the boundary of the model;
      (ii) calculating, at each of a plurality of second locations which are defined using the boundary and which are not on the boundary, a corresponding force, said force being calculated using said calculated forces at the first locations, wherein the force at said second locations is calculated by defining, for each said second location, a corresponding neighbourhood, and calculating the force at the second location using the average of said calculated forces at each said first location within the corresponding neighbourhood, and
      (iii) modifying the level set function at the first and second locations according to the corresponding calculated forces;
      the iteration terminating when a minimum of an energy function is reached, the energy function being related to the calculated forces at the first locations on the boundary; and
   (c) generating said model as the level set of the modified level set function.

* * * * *